United States Patent
Vangal-Ramamurthy et al.

(10) Patent No.: US 8,996,143 B2
(45) Date of Patent: Mar. 31, 2015

(54) SYSTEM AND METHOD TO ALIGN A BOSS OF A HEAD GIMBAL ASSEMBLY TO A BOSS HOLE OF AN ACTUATOR ARM FOR DISK DRIVE ASSEMBLY

(75) Inventors: Jambunathan Vangal-Ramamurthy, San Jose, CA (US); Omar C. Osorio, Bangkok (TH)

(73) Assignee: Western Digital Technologies, Inc., Irvine, CA (US)

( * ) Notice: Subject to any disclaimer, the term of this patent is extended or adjusted under 35 U.S.C. 154(b) by 793 days.

(21) Appl. No.: 13/226,118

(22) Filed: Sep. 6, 2011

(65) Prior Publication Data

US 2013/0057986 A1 Mar. 7, 2013

(51) Int. Cl.
*G11B 5/58* (2006.01)
*G11B 5/48* (2006.01)

(52) U.S. Cl.
CPC .................................. *G11B 5/4806* (2013.01)
USPC .......................................................... 700/59

(58) Field of Classification Search
CPC .. G11B 5/4806; G11B 5/4813; G11B 5/4826; G11B 5/4833; H05K 3/0008; H05K 7/1454; H05K 13/0015; G05B 2219/37564; G05B 2219/49112–2219/49114
USPC .................................... 700/56–64, 117, 186; 29/603.01–603.05; 269/53–54.5; 269/67–69; 360/244.5, 245
See application file for complete search history.

(56) References Cited

U.S. PATENT DOCUMENTS

| | | | |
|---|---|---|---|
| 5,097,584 A | 3/1992 | Cain et al. | |
| 5,153,794 A | 10/1992 | Hinlein | |
| 5,265,325 A | 11/1993 | Fortin | |
| 5,444,587 A | 8/1995 | Johnson et al. | |
| 5,574,234 A | 11/1996 | Schudel | |
| 5,706,574 A | 1/1998 | Shimanuki | |
| 5,717,545 A | 2/1998 | Brooks, Jr. et al. | |
| 5,796,555 A | 8/1998 | Aoyagi et al. | |
| 6,128,164 A | 10/2000 | Kant et al. | |
| 6,183,841 B1 * | 2/2001 | Hanrahan et al. | 428/132 |
| 6,215,624 B1 | 4/2001 | Summers et al. | |
| 6,269,532 B1 | 8/2001 | Toensing | |
| 6,389,684 B1 | 5/2002 | Toensing et al. | |
| 6,704,995 B2 | 3/2004 | Toensing et al. | |
| 6,765,763 B2 * | 7/2004 | SeeToh et al. | 360/264.2 |
| 6,772,506 B2 | 8/2004 | Toensing | |
| 6,779,252 B2 * | 8/2004 | Tracy et al. | 29/739 |
| 6,941,641 B2 | 9/2005 | Van Sloun | |
| 7,127,799 B2 * | 10/2006 | Girard et al. | 29/603.1 |
| 7,313,855 B2 | 1/2008 | Van Sloun et al. | |
| 7,505,860 B2 * | 3/2009 | Herdendorf et al. | 702/108 |

(Continued)

*Primary Examiner* — M. N. Von Buhr (57) ABSTRACT

Disclosed is a method and system comprising: an alignment pin to be positioned adjacent to the boss hole (BH) of an actuator arm (AA); an actuator coupled to the alignment pin to move the alignment pin; an imaging device; and a computing device that performs operations including: commanding the imaging device to produce an image of the position of the alignment pin relative to the BH of the AA; commanding the HGA to be positioned in the AA such that the boss of the HGA is adjacent to the BH of the AA; and, based on the image, commanding the actuator to move the alignment pin such that the alignment pin is concentric relative to the BH and to move the alignment pin through an opening of the boss of the HGA such that the boss of the HGA is concentric and aligned with the BH of the AA.

14 Claims, 5 Drawing Sheets

(56) References Cited

U.S. PATENT DOCUMENTS

| | | |
|---|---|---|
| 7,549,204 B1 * | 6/2009 | Vangal-Ramamurthy et al. .................. 29/407.02 |
| 7,562,434 B2 | 7/2009 | Ishikawa et al. |
| 7,581,309 B2 | 9/2009 | Matsummura et al. |
| 8,144,431 B2 * | 3/2012 | Chang et al. ............... 360/264.2 |
| 8,169,750 B1 * | 5/2012 | Guzik et al. ................ 360/294.4 |
| 8,480,066 B2 * | 7/2013 | Anderson et al. ............... 269/58 |
| 8,561,285 B1 * | 10/2013 | Vangal-Ramamurthy et al. .................. 29/603.03 |
| 8,710,858 B2 * | 4/2014 | Detofsky et al. ......... 324/756.01 |
| 2008/0238460 A1 * | 10/2008 | Kress et al. ................... 324/758 |
| 2009/0052088 A1 | 2/2009 | Lim |
| 2009/0261358 A1 * | 10/2009 | Chitnis et al. ................... 257/88 |

* cited by examiner

SYSTEM AND METHOD TO ALIGN A BOSS OF A HEAD GIMBAL ASSEMBLY TO A BOSS HOLE OF AN ACTUATOR ARM FOR DISK DRIVE ASSEMBLY

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, server computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk fastener to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

Due to the cost competiveness of the disk drive industry, the components of a disk drive need to be assembled in a very precise and cost effective manner. In order to be cost effective, complex components of the disk drive, such as HDAs, disk clamps, disks, spindle motors, HSAs, actuator arms, HGAs, etc., need to be assembled, in a very time effective manner with a very low error rate—even though many of the components require highly precise assembly. Also, many of these types of components often need to be assembled in a very clean fashion in which debris and contamination particles are kept to a minimum. Further, as disk drives are being actively utilized more and more by users as standard hard disk drives, enterprise hard disk drives, moveable external disk drives, and/or for use in smaller computing devices such as laptops and mobile devices (e.g. PDAs, cell-phones, etc.), they are increasingly requiring smaller and smaller components for assembly.

In particular, small-form-factor mobile/enterprise hard disk drives require an assembly process that uses a relatively small head stack assembly (HSA), including an actuator arm and an HGA, which has a tight tolerance, especially in terms of boss alignment. Unfortunately, it is difficult to assemble HGAs to actuator arms utilizing conventional assembly mechanisms because both the HGAs and actuator arms are increasingly becoming smaller in size.

In particular, current manufacturing processes to assemble the HGA with the actuator arm, as they have become increasingly smaller, are causing performance issues, assembly errors, contamination problems, and yield problems. Specifically, many yield problems are occurring because of the rejection of many disk drives due to HGA boss misalignment with the actuator arm during the assembly process. A particular example of a yield problem is that in the assembly of the HSA in which the HGA boss is mounted to the actuator arm, large misalignment errors and jams are occurring resulting in improper assembly and causing the failure of many disk drives. Unfortunately, this is very time consuming for maintenance technicians/engineers to identify the misalignment problems and to redo the assembly process.

Therefore, it would be beneficial to provide a method and system to align a boss of an HGA to a boss hole of an actuator arm for mounting the HGA to the actuator arm to reduce potential alignment issues to thereby decrease disk drive assembly failure, particle contamination, and assembly down time.

DETAILED DESCRIPTION

Figure 1:
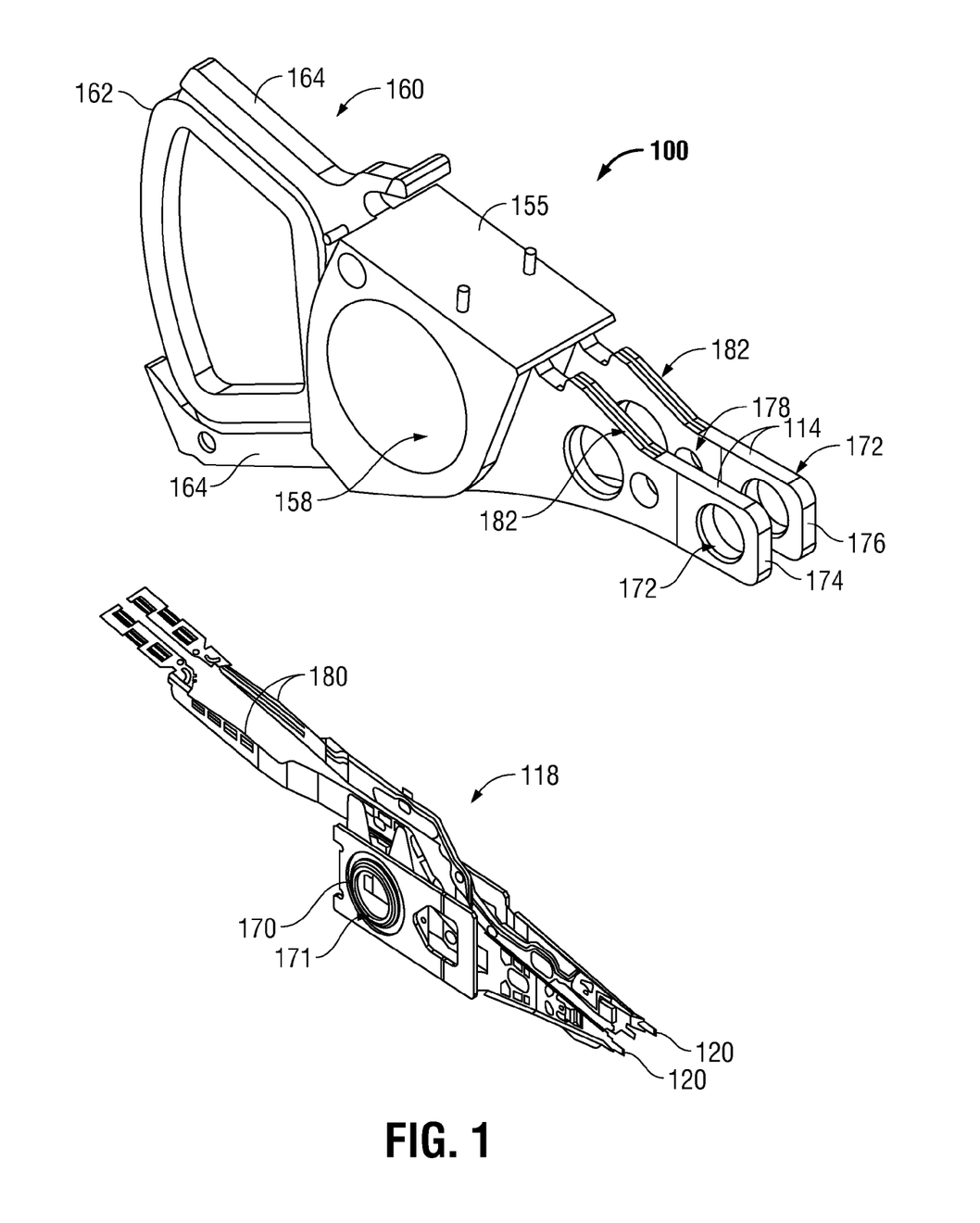
FIG. 1 is a diagram of an example of an actuator arm and an HGA that may be utilized with embodiments of the invention.

With reference to FIG. 1, a diagram of an example of an actuator 100 that may be utilized with embodiments of the invention is described. As is well known, a disk drive may include a spindle, rotatively mounted on the disk drive base, for rotating a disk mounted on the spindle. Disk drives may have a single disk or may have multiple disks. A disk drive may further include an actuator 100 that is rotatably mounted to the disk drive base. The actuator 100 may include an actuator arm 114 that supports a head gimbal assemble (HGA) 118. A coil motor may rotate the actuator 100 through a limited angular range so that the HGA 118 may be desirably positioned relative to one of more tracks with information on the disk. During disk drive operation, the actuator 100 moves heads 120 of the HGA 118 over the disk. The actuator 100 may be part of a head stack assembly (HSA). It should be appreciated that HSAs, actuators, HGAs, etc., are well known in the art, and this is but one example, and is only briefly described.

Looking at this particular example of an actuator 100, the actuator 100 may include a HGA 118 having head(s) 120 that is mounted to the actuator arm 114. The actuator 110 includes a body portion 155 having a pivot bore 158 for a receipt of a pivot bearing cartridge (not shown). The actuator arm 114 may include a pair of parallel actuator arms 174 and 176 that are cantilevered from the body portion 155 and a coil assembly 160 that is cantilevered from the body portion 150 in an opposite direction from the actuator arm 114 for use by a voice coil motor (VCM) (not shown) that rotates the actuator 100. As is well known, the coil assembly 160 may include a coil 162 mounted between a pair of forks 164 and the VCM having magnets may be used to rotate the actuator 100 based upon the coil 162 in order to form a VCM assembly to cause the pivoting of the actuator 100 about the pivot access.

It should be appreciated that actuators 100, VCMs, HGAs 118, etc., and their use by disk drives are well known in the art. In this particular example, HGA 118 is mounted within actuator arm 114 in a slot 178 between the parallel actuator arms 174 and 176 having boss holes 172. In particular, a boss 170 having an opening 171 of HGA 118 is mounted into a boss hole 172 of actuator arm 174 for mounting the HGA 118 to the actuator arm 114. HGA 118 may be mounted in between actuator arms 174 and 176 such that tails 180 of HGA 118 are mounted into slots 182 of actuator arms 174 and 176, respectively. As is well known, the VCM may be used to control the position the heads 120 of the HGA 118 relative to a disk for writing and/or reading data. It should be appreciated that HGAs 118, actuators 100, VCMs, and the operations of disk drives, are well known, however embodiments of the invention hereinafter described relate to a novel and non-obvious system and method to align the boss 170 of the HGA 118 to the boss hole 172 of the actuator arm 114 for disk drive assembly. Hereinafter the term actuator arm 114 may refer to either actuator arm 174 or 176.

Figure 2:
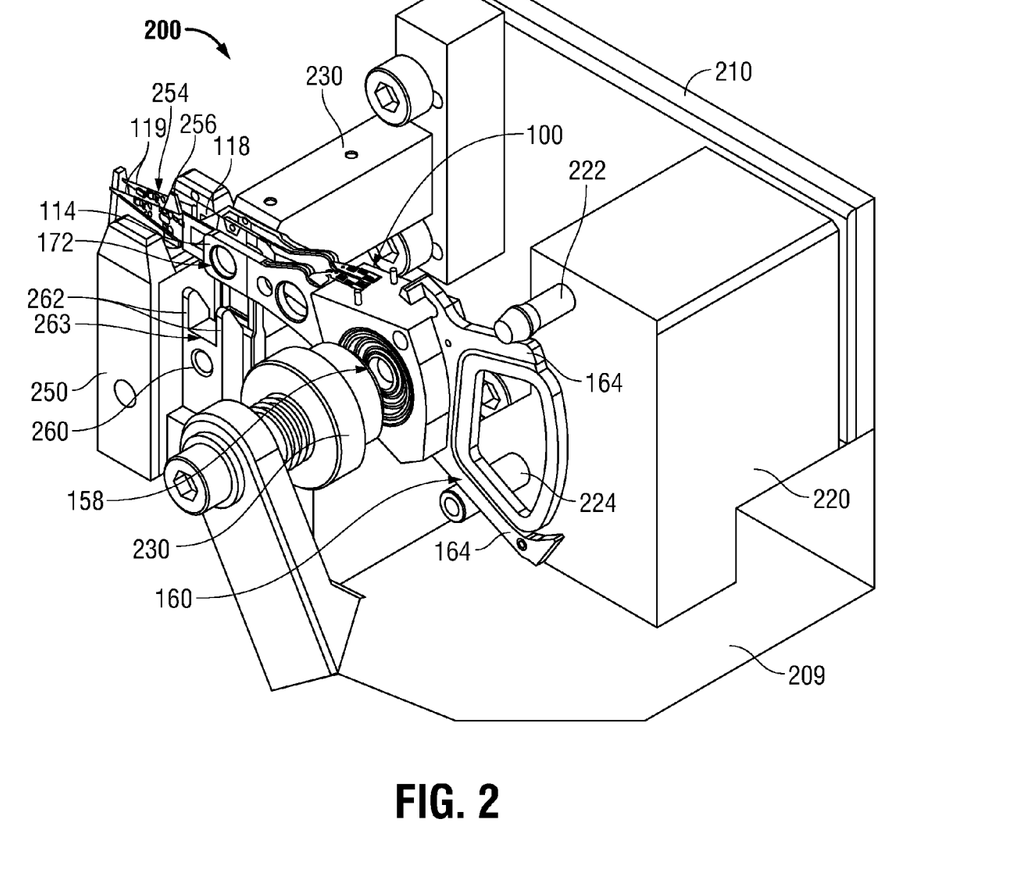
FIG. 2 is a diagram of a manufacturing system used in aligning a boss of an HGA to a boss hole of an actuator arm, according to one embodiment of the invention.

Turning now to FIG. 2, a diagram of a manufacturing system 200 to align a boss of an HGA 118 to a boss hole 172 of an actuator arm 114 is shown. The manufacturing system 200 may include a bottomwall 209 and a backwall 210 mounted thereto. A protruding mounting portion 220 extending from the backwall 210 and mounted to the bottomwall 209 includes a protruding first pin 222 and protruding second pin 224 that mount against the forks 164 of the coil assembly 160 to hold the actuator 100 in place. Further, a spring loaded hold down fastener 230 may further extend through the pivot bore 158 to hold the actuator 100 in place. Moreover, the manufacturing system 200 may include an alignment pin mechanism 230 extending from the backwall 210 that is used to align a boss of the HGA 118 to the boss hole 172 of the actuator arm 114, according to embodiments of the invention, as will be discussed hereinafter in great detail.

Additionally, manufacturing system 200 may include an HGA holder 250 that protrudes from the backwall 210 and that is mounted to the bottomwall 209. The HGA holder 250 may include a U-shaped channel 254 in which the HGA 118 is mounted and a protruding approximately triangular shaped separator 256 that is placed between arms 119 of the HGA 118. The HGA holder 250 holds the HGA 118 in place during assembly. Moreover, the manufacturing system 200 may include a swage key 260 extending from the HGA holder 250 that has four fingers 262 and a recess 263 that abuts against the HGA 118 and the actuator arm 114 to hold the boss of the HGA 118 centered and aligned with the boss hole 172 of the actuator arm 114, as will be described.

Figure 3:
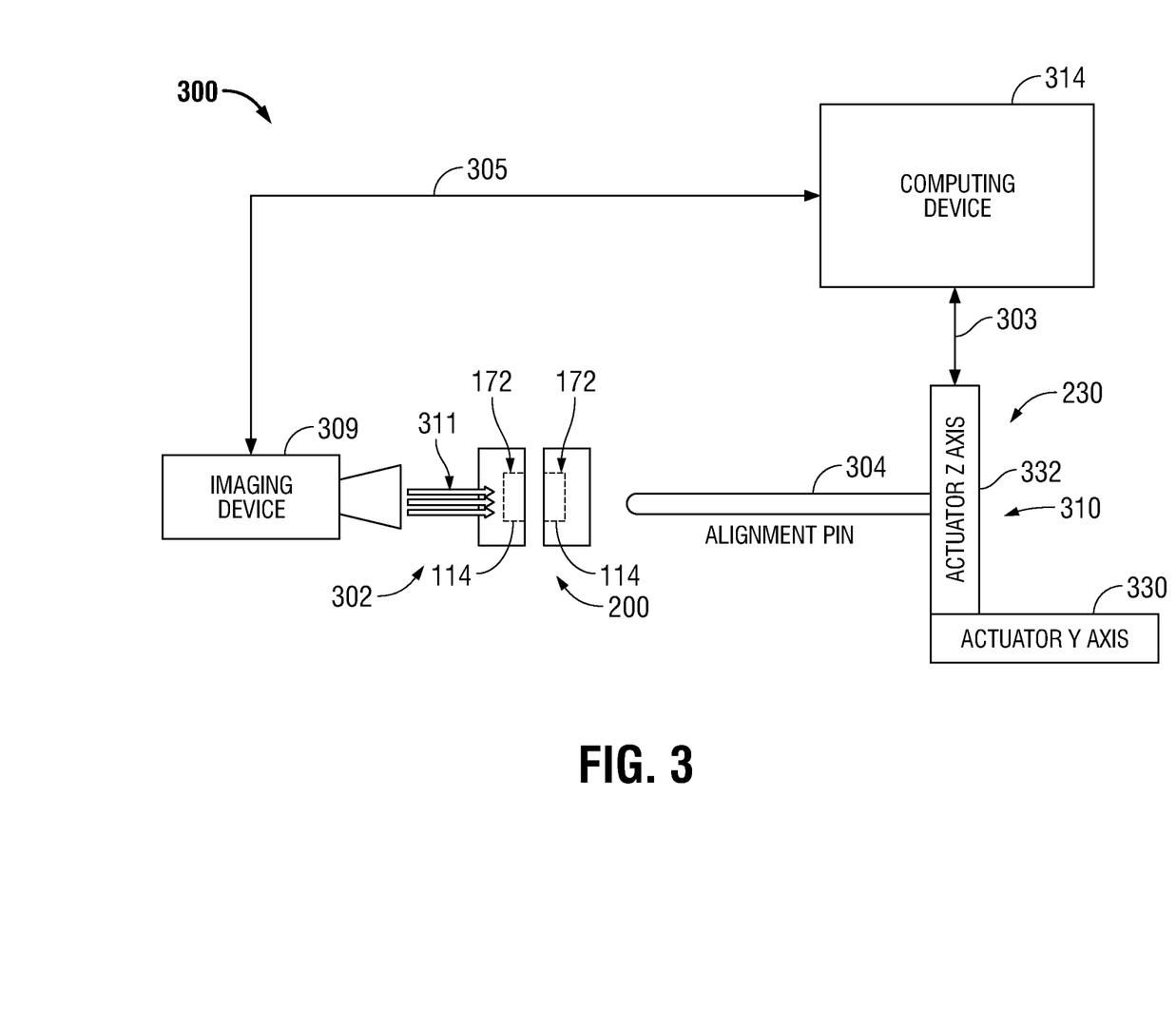
FIG. 3 is a diagram of a system to align a boss of an HGA to a boss hole of an actuator arm, according to one embodiment of the invention.

With reference to FIG. 3, FIG. 3 is a diagram of a system 300 to align a boss of an HGA to a boss hole 172 of an actuator arm 114. In system 300, components of the alignment pin mechanism 230 are shown which include an alignment pin 304 that is positioned adjacent to the boss hole 172 of an actuator arm 114 and an actuator 310 that is coupled to the alignment pin 304. The boss holes 172 of the actuator arm 114 are shown as being part of the components of the system 200. An imaging device 309 is also utilized by the system 300. Further, a computing device 314 is coupled to the actuator 310 and the imaging device 309 by links 303 and 305.

The computing device 314 may be used to perform operations comprising: commanding the imaging device 309 to take a picture of (e.g., lines 311) and produce an image of the position of the alignment pin 304 relative to the boss hole 172 of the actuator arm 114; commanding the HGA 118 to be positioned in the actuator arm 114 such that the boss 170 of the HGA is adjacent to the boss hole 172 of the actuator arm 114; and based on the image, commanding the actuator 310 to move the alignment pin 304 such that the alignment pin 304 is concentric relative to the boss hole 172 of the actuator arm 114 and to move the alignment pin 304 through an opening 171 of the boss 170 of the HGA 188 such that the boss of the HGA is concentric and aligned with the boss hole 174 of the actuator arm.

In one embodiment, actuator 310 may include a first actuator 330 (actuator y-axis) to move the alignment pin 304 in a horizontal direction and a second actuator 332 (actuator z-axis) to move the alignment pin 304 in a vertical position. The first and second actuators 330 and 332 may be electronic actuators. In one embodiment, the first and second actuators 330 and 332 may be nano-stage actuators. In this example, the nano-stage actuators operate with a stroke of approximately +/−1 millimeter and an accuracy of at least +/−1 micron. Also, in one embodiment, imaging device 309 may be a camera.

Moreover, in one embodiment, a separate controller may be utilized with the imaging device 309 that may be coupled to the computing device 314 for controlling the imaging device 309. Additionally, one or more separate controllers may be utilized with the electronic/nano-stage actuators 330 and 332 that are coupled to the computing device 314 and that may be utilized to control the electronic/nano-stage actuators 330 and 332.

Figure 4:
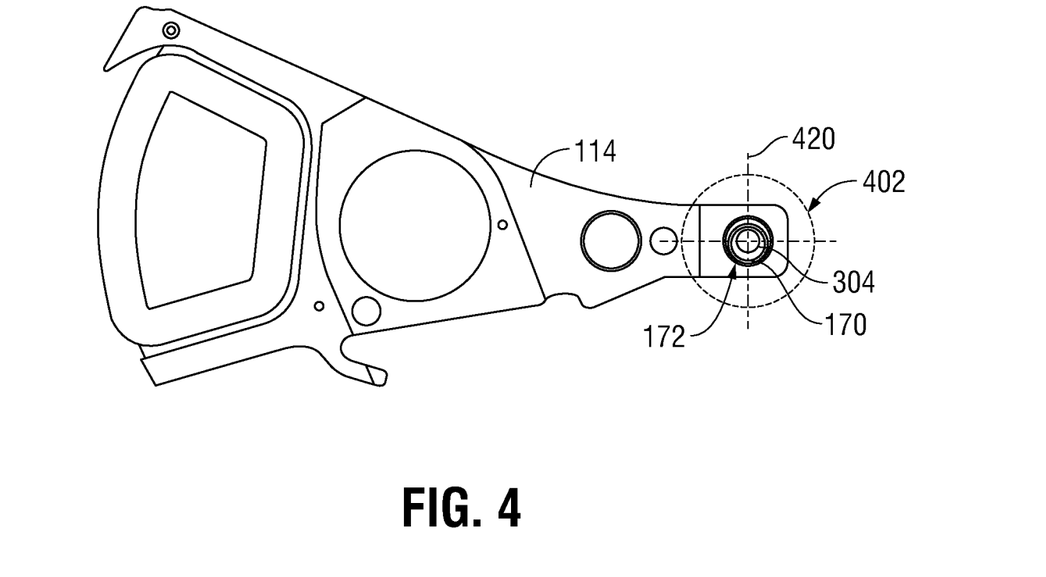
FIG. 4 is a diagram of a camera view taken by camera of the position of the alignment pin relative to the boss hole of the actuator arm, according to one embodiment of the invention.

With reference FIG. 4, FIG. 4 is a diagram of a camera view 402 taken by camera 309 of the position of the alignment pin 304 relative to the boss hole 172 of the actuator arm 114. The cross hairs 420 of the camera image are also shown. As can be seen in FIG. 4, the pin 304 is significantly offset from the center of the boss hole 172 of the actuator arm 114. Also, it can be seen that if the boss 170 of the HGA were present it would be also be significantly offset from the center of the boss hole 172 of the actuator arm 114.

Figure 5:
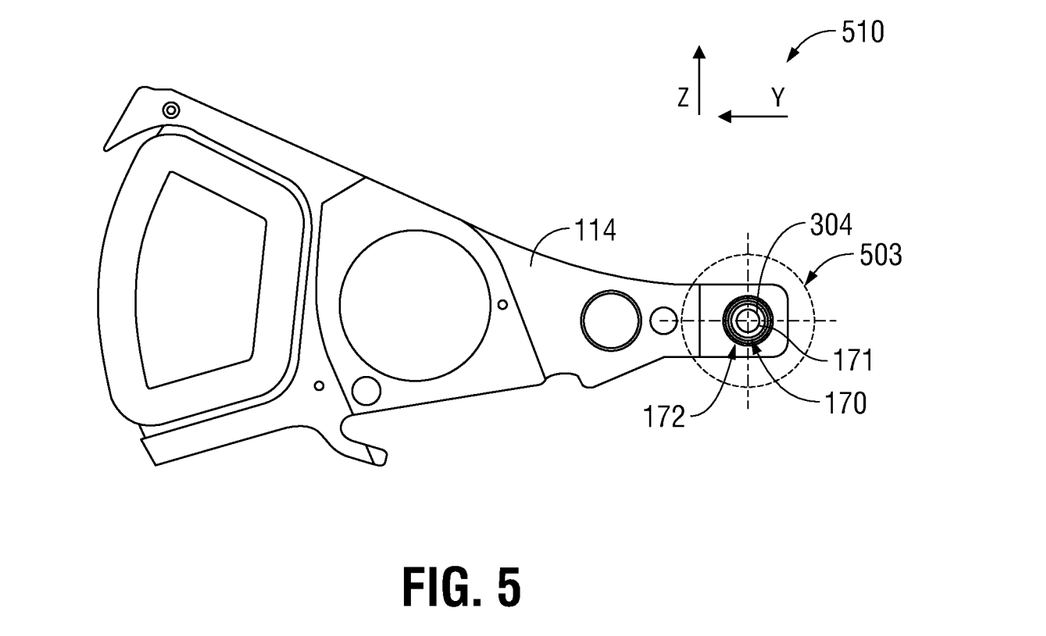
FIG. 5 is an additional diagram of a camera view illustrating the alignment pin after it has been moved, according to one embodiment of the invention.

With reference to FIG. 5, an additional diagram of a camera view 503 illustrating the alignment pin 304 after it has been moved is shown. At this point in the process, the HGA has been positioned in the actuator arm 114 such that the boss 170 of the HGA is adjacent to the boss hole 172 of the actuator arm 114. As can be seen in FIG. 5, based on the image 503, the actuator 310 has moved the alignment pin 304 in the z and y direction 510 such that the alignment pin 304 is concentric relative to the boss hole 172 of the actuator arm 117 and has been moved through the opening 171 of the boss 170 of the HGA such that the boss 170 of the HGA is concentric and aligned with the boss hole 172 of the actuator arm 114. It should be appreciated that, in one embodiment, the images of camera 309 and the movement of the y and z actuators 330 and 332 may be controlled by computing device 314 in order to implement this process.

Figure 6:
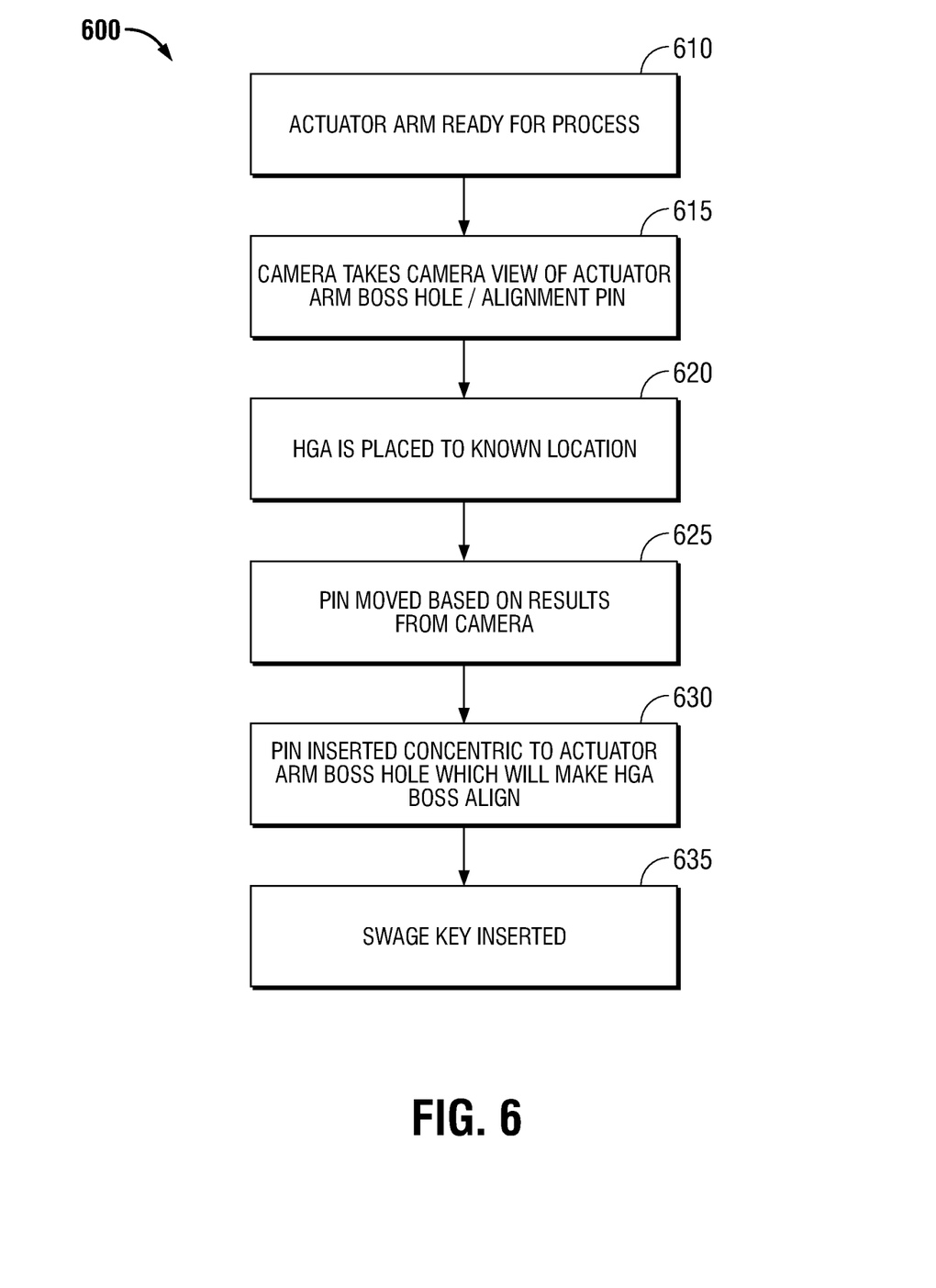
FIG. 6 is a flow diagram that illustrates a process to align a boss of an HGA to a boss hole of an actuator arm, according to one embodiment of the invention.

With reference to FIG. 6, a flow diagram 600 is shown to illustrate a process to align a boss of an HGA to a boss hole of an actuator arm. At block 610, an actuator arm 114 is ready for processing. At block 615, camera 309 takes a camera view 402 of the actuator arm boss hole 172 and the alignment pin 304. At block 620, the HGA 118 is placed to a known location in the actuator arm 114. At block 625, alignment pin 304 is then moved to an optimal position based upon the results of the previous image 402 taken by the camera 309. In particular, alignment pin 304 is inserted concentric to the actuator arm boss hole 172 which in turn goes through the opening 171 of the HGA boss 170 to align the HGA boss with the actuator arm boss hole. In this way the HGA boss 170 is aligned with the boss hole 172 of the actuator arm 114.

Next, in block 630, a swage key 260 that has four fingers 262 and a recess 263 may be used (e.g., see FIG. 2) to abut against the HGA 118 and the actuator arm 114 to hold the boss 170 of the HGA 118 centered and aligned with the boss hole 172 of the actuator arm 114. The alignment pin 304 may then be removed. It should be appreciated that process steps 600 to control the movement of the HGA 118, the camera 309, the movement of the actuator 310, and to implement the other previously-described functions may be implemented under the control of computing device 314.

After this, a swaging process to mount the boss 170 of the HGA 118 to the boss hole 172 of the actuator arm 114 may be utilized such that the HGA 118 is properly mounted to the actuator arm 114. In one embodiment, a swaging process may be utilized in which a plurality of swaging press balls (e.g., 3 press balls) are inserted to the opening 171 of the boss 170 to swage the boss 170 of the HGA 118 to the boss hole 172 of the actuator arm 114. It should be appreciated that this swaging process may be implemented at the previously-described manufacturing station 200 or at a different manufacturing station, as part of the disk drive assembly process.

In this way, an efficient way to actively align the boss 170 of the HGA 118 to the boss hole 172 of the actuator arm 114 is provided in a very precise way with very little alignment issues and therefore minimizes particle contamination and manufacturing downtime. This is especially useful for small form factor mobile/enterprise head stack assemblies. In essence, a highly efficient methodology to actively align the boss 170 of the HGA 118 with the boss hole 170 of the actuator arm 114 as part of the assembly process for swaging is provided. This may significantly increase yield in the HGA stacking process. Further, this process significantly reduces damages due to misalignment like stripping, scarping, denting, etc.

The previous-described functions may be implemented by software/firmware/middleware etc. of computing device 314. However, it should be appreciated that a wide variety of electronic devices may be utilized to perform these functions such as various types of circuitry, processors, controllers, etc.

For purposes of the present specification, it should be appreciated that the terms "processing logic unit (PLU)", "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

What is claimed is:

1. A system to align a boss of a head gimbal assembly (HGA) to a boss hole of an actuator arm for mounting the HGA to the actuator arm, the system comprising:
   an alignment pin to be positioned adjacent to the boss hole of the actuator arm;
   an actuator coupled to the alignment pin to move the alignment pin;
   an imaging device;
   a computing device coupled to the actuator and the imaging device, the computing device to perform operations comprising:
      commanding the imaging device to produce an image of the position of the alignment pin relative to the boss hole of the actuator arm;
      commanding the HGA to be positioned in the actuator arm such that the boss of the HGA is adjacent to the boss hole of the actuator arm; and
      based on the image, commanding the actuator to move the alignment pin such that the alignment pin is concentric relative to the boss hole and to move the alignment pin through an opening of the boss of the HGA such that the boss of the HGA is concentric and aligned with the boss hole of the actuator arm; and
   a swage key that holds the boss of the HGA concentric and aligned with the boss hole of the actuator arm, wherein a swaging process mounts the boss of the HGA to the boss hole of the actuator arm such that the HGA is mounted to the actuator arm.

2. The system of claim 1, wherein, the actuator includes a first actuator to move the alignment pin in a horizontal direction and a second actuator to move the alignment pin in a vertical direction.

3. The system of claim 2, wherein, the first and second actuators are electronic actuators.

4. The system of claim 3, wherein, the first and second actuators are nano-stage actuators.

5. The system of claim 4, wherein, the nano-stage actuators operate with a stroke of approximately +/−1 millimeter and an accuracy of at least +/−1 micron.

6. The system of claim 1, wherein, the imaging device is a camera.

7. The system of claim 1, wherein, the swaging process utilizes a plurality of swaging press balls.

8. A method to align a boss of a head gimbal assembly (HGA) to a boss hole of an actuator arm for mounting the HGA to the actuator arm, the method comprising:
   positioning an alignment pin adjacent to the boss hole of the actuator arm;

commanding an imaging device to produce an image of the position of the alignment pin relative to the boss hole of the actuator arm;

commanding the HGA to be positioned in the actuator arm such that the boss of the HGA is adjacent to the boss hole of the actuator arm;

based on the image, commanding the movement of the alignment pin such that the alignment pin is concentric relative to the boss hole and to move the alignment pin through an opening of the boss of the HGA such that the boss of the HGA is concentric and aligned with the boss hole of the actuator arm;

holding the boss of the HGA concentric and aligned with the boss hole of the actuator arm utilizing a swage key; and implementing a swaging process to mount the boss of the HGA to the boss hole of the actuator arm such that the HGA is mounted to the actuator arm.

9. The method of claim 8, wherein, the alignment pin is positioned by an actuator that includes a first actuator to move the alignment pin in a horizontal direction and a second actuator to move the alignment pin in a vertical direction.

10. The method of claim 9, wherein, the first and second actuators are electronic actuators.

11. The method of claim 10, wherein, the first and second actuators are nano-stage actuators.

12. The method of claim 11, wherein, the nano-stage actuators operate with a stroke of approximately +/−1 millimeter and an accuracy of at least +/−1 micron.

13. The method of claim 9, wherein, the imaging device is a camera.

14. The method of claim 8, wherein, the swaging process utilizes a plurality of swaging press balls.

* * * * *